United States Patent

Zerbola

[15] 3,635,532
[45] Jan. 18, 1972

[54] HYDROSTATICALLY SUPPORTED MACHINE TOOL SLIDE

[72] Inventor: Giorgio Zerbola, Turin, Italy

[73] Assignee: RIV-SKF Officine di Villar Perosa S.p.A., Turin, Italy

[22] Filed: Feb. 4, 1970

[21] Appl. No.: 8,479

[30] Foreign Application Priority Data

Feb. 8, 1969    Italy.................................50507 A/69

[52] U.S. Cl........................................................308/5, 184/5
[51] Int. Cl........................................................F16c 17/00
[58] Field of Search................308/5, 240, 9; 90/58, DIG. 13; 184/5, 100, 6 K

[56] References Cited

UNITED STATES PATENTS

| | | | |
|---|---|---|---|
| 3,484,064 | 12/1969 | Koenig................................. | 308/5 |
| 3,355,990 | 12/1967 | Thum................................... | 308/5 |
| 3,231,319 | 1/1966 | Porath................................. | 308/5 |
| 2,411,391 | 11/1946 | Robaczynski........................ | 184/5 |

FOREIGN PATENTS OR APPLICATIONS 702,584   1/1954   Great Britain............................308/5

Primary Examiner—Martin P. Schwadron
Assistant Examiner—R. H. Lazarus
Attorney—Sughrue, Rothwell, Mion, Zinn and Macpeak

[57] ABSTRACT

A hydrostatically supported machine tool slide has two spaced-apart bilateral cylindrical hydrostatic bearings for longitudinal movement of the slide along a guide shaft fixed to a bed, together with a bilateral flat hydrostatic bearing acting on a member of the bed to prevent rotation of the slide about the axis of the cylindrical bearing, affording a three-point isostatic support.

1 Claims, 6 Drawing Figures

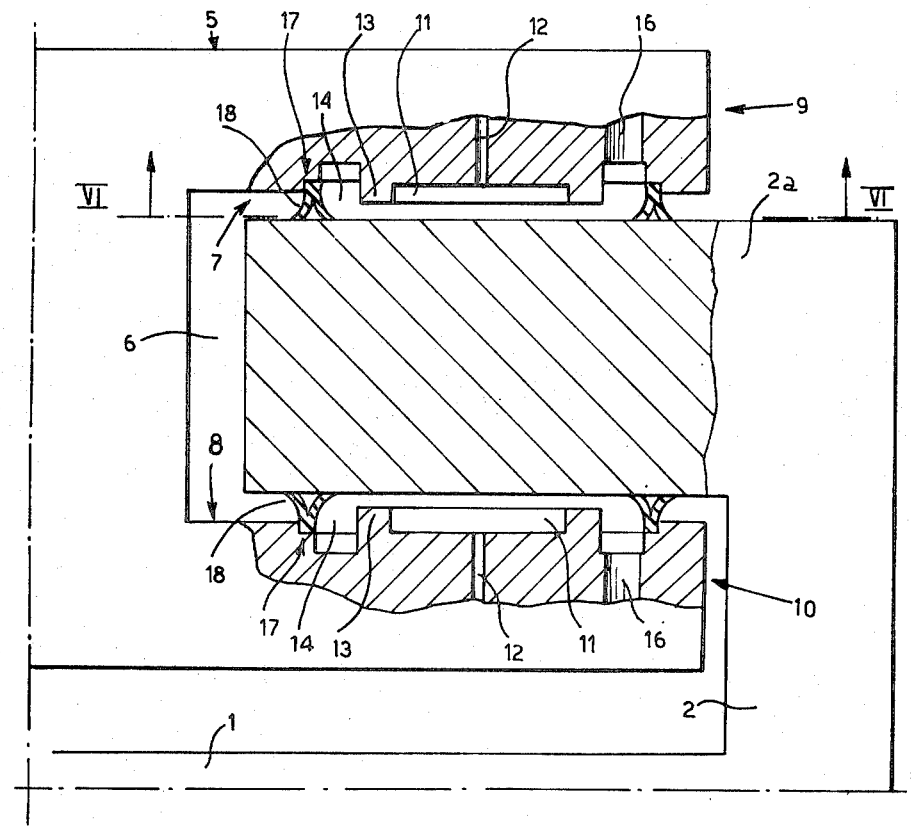
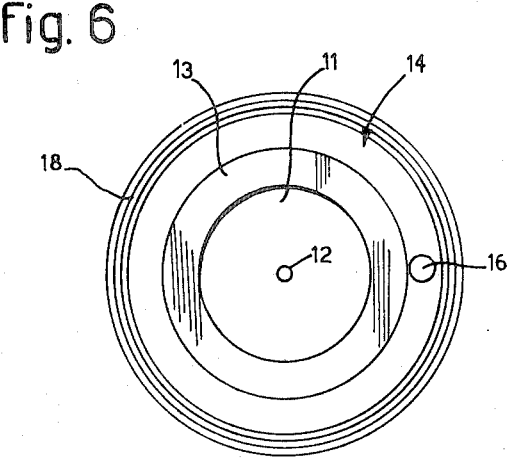

HYDROSTATICALLY SUPPORTED MACHINE TOOL SLIDE

The present invention relates to a slide, especially for machine tools, with hydrostatic bearing, of the type in which the relatively sliding surfaces move in relation to one another without making contact, being separated by a film of oil supplied under pressure to a pressure pad.

The general principles of the hydrostatic support of slides of this type are well known. In particular it is known to deliver oil under pressure by a pump into ducts made in one of the two relatively sliding surfaces, the pressure being maintained by the viscous resistance which the oil encounters in passing through the restricted passage which exists between the two surfaces.

Stability of a slide of this type is obtained by regulating the flow of oil according to the laws of hydrostatics.

It is also known that maximum rigidity of the slide is achieved by using bilateral hydrostatic support, in such a way that the force exerted by a support upon a slide shall be balanced by that exerted by an opposite support, and not solely by the weight of the slide itself, as occurs with a unilateral support. Bilateral support is indispensible when the slide movement does not occur in a vertical plane, so that use cannot be made of the force of gravity as a resistance.

Many forms of slide are well known, having a single degree of freedom for movement in one direction only, for example, parallel to the longitudinal axis of the slide. In such slides, the cross section of the mutually sliding surfaces are either exclusively prismatic or exclusively cylindrical.

It is difficult in practice to achieve isostatic structures, since this requires extremely fine tolerances in manufacture; moreover these constructions have to be bulky in order to reduce to the minimum elastic yielding of the structure which could compromise the accuracy of the slide.

In a known hydrostatic slide intended to move on fixed guides, it is not in practice possible to resolve satisfactorily the problem of thermal expansion due to heating of the oil in hydraulic circulation or to the heat transmitted to the slide through drive shafts connected to the slide from drive motors. Such thermal expansion causes the slide to bear against its guide.

In slides made exclusively with sliding surfaces of prismatic cross section, the oil under pressure is allowed to escape freely and is then recovered in external cups and channels, with the additional difficulty of obtaining suitable sealing around the working area, consisting generally of rectangular section sliding blocks.

Moreover the free outflow of oil carries the danger of contamination of the oil itself by other liquids or by impurities present in the machine provided with the slide.

According to the present invention, there is provided, with a view to eliminating the said disadvantages, a slide with hydrostatic support, especially for machine tools, characterized in that the slide is supported by means of a flat hydrostatic support of bilateral action and two cylindrical hydrostatic supports each of bilateral action.

Preferably the flat hydrostatic support consists of two annular sliding blocks arranged opposite each other, each block having a sump supplied with oil under pressure, an annular oil collector channel surrounding each sump and provided with at least one oil discharge duct, and an annular sealing strip surrounding said collector channel.

Further features and advantages of the present invention will appear from the following description, given by way of example, with reference to the accompanying drawings, in which:

FIG. 5 is a view, on an enlarged scale of a detail of FIG. 2, and

FIG. 6 is a view taken along the line VI—VI of FIG. 5.

Figure 1:
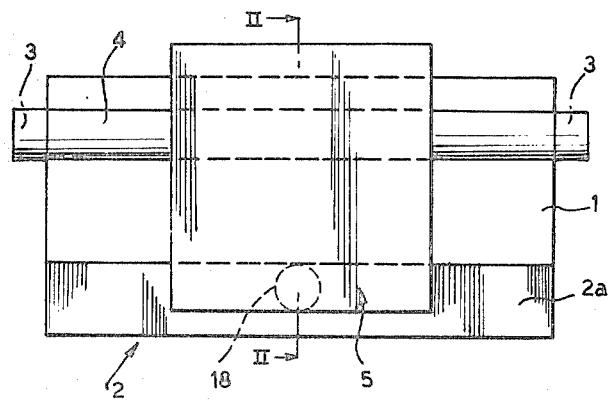
FIG. 1 is a plan view of a slide according to one embodiment of the invention.

In the drawings 1 indicates a machine tool bed of rectangular shape having a longitudinal appendage 2, extending from one of its side edges. The appendage 2 has the shape of an L with a horizontal tongue member 2a projecting inwardly parallel to the upper surface of the bed 1. The bed 1 supports, a horizontal shaft 4 fixed to it by means not shown.

The shaft 4 and the tongue member 2a support a horizontally movable slide 5 which runs longitudinally on the bed 1 and which has upon its sidewall facing towards the appendage 2, a slot 6 of rectangular cross section for receiving the tongue member 2a. A substantial clearance exists between the tip of the tongue member 2a and the base of the slot 6. The slide 5 also has a longitudinal bore in which the shaft 4 is received.

The slot 6 has, on both its upper and lower horizontal surfaces 7 and 8, a single bilateral hydrostatic bearing in the form of pressure pads 9 and 10 of circular shape.

Each of the pressure pads 9, 10 (FIG. 5) is provided with a central cylindrical sump 11 having a vertical axis, with which a central tube 12 delivering oil under pressure communicates. The sump 11 is surrounded by an annular projection 13 which separates the sump 11 from an outer annular oil collector channel 14 coaxial with the sump 11. An oil discharge tube 16 communicates with the channel 14.

The external annular wall of the channel 14 is formed with a circumferential rebate 17 in which a circular seal 18 is located. The seal 18 prevents the escape of the oil under pressure into the slot 6 of the slide 5.

Figure 3:
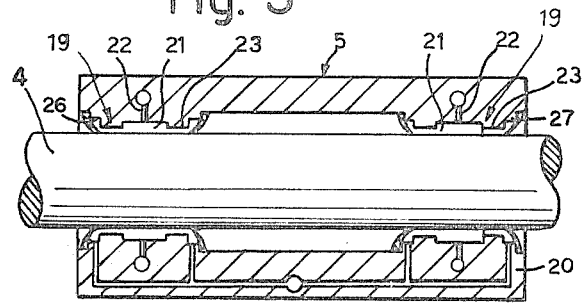
FIG. 3 is a section on an enlarged scale along the line III—III of FIG. 2.
Figure 4:
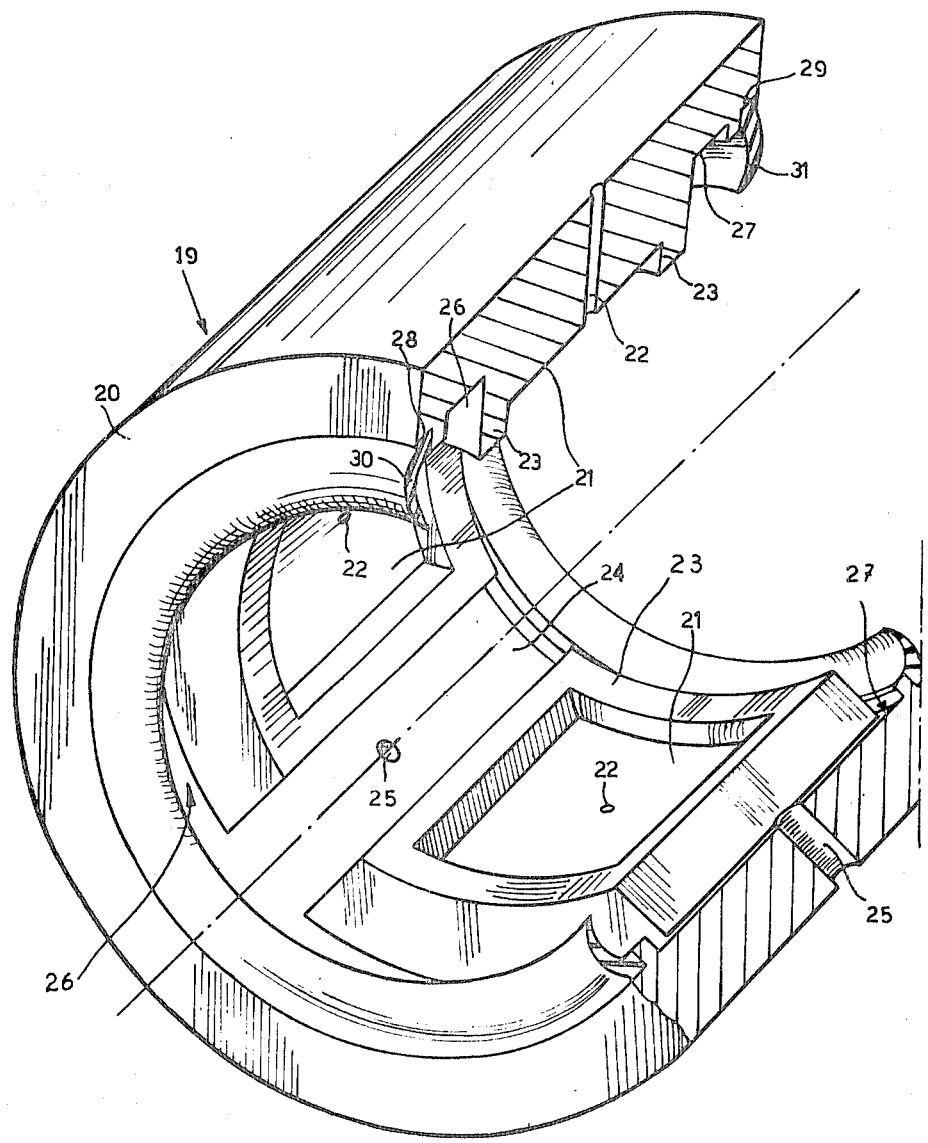
FIG. 4 is a perspective view, partly cut away, of a cylindrical hydrostatic bearing of the slide of FIGS. 1 to 3.

The slide 5 has two cylindrical hydrostatic bearings supports 19 (FIG. 3) at axially spaced apart positions along the shaft 4. Each of the bearings 19 consists of four hydrostatic pressure pads arranged in two diametrically opposite pairs, each being rectangular in development. Two of the pads are illustrated in FIG. 4.

Each bearing 19 is formed in a sleeve 20 which is a force-fit in the bore of the slide 5. Naturally each bearing 19 could alternatively be formed directly in the bore of the slide 5.

Each of the four pressure pads of the sleeve 20 is made up of a central rectangular sump 21 through which, by means of a central aperture 22, oil under pressure is delivered to the sump 21.

The walls of each sump 21 are formed by rectangular projections which separate the sump 21 from a longitudinal channel 24 (FIG. 4) into which an oil discharge hole 25 opens. There are four longitudinal channels 24 spaced at equal circumferential intervals on the internal cylindrical surface of the sleeve 20. Two circumferential oil collector channels, 26 and 27 are formed on opposite axial sides of the sumps 21.

The four longitudinal channels 24 and the two transverse circumferential channels 26 and 27 form channels bounding the four pressure pads.

On the outside of the two circumferential channels 26 and 27, circumferential grooves, 28 and 29, are formed at opposite axial ends of each sleeve 20. Sealing strips 30 and 31 respectively are located in the grooves 28 and 29 to bring about sealing between the shaft 4 and each sleeve 20.

The two cylindrical hydrostatic bearings 19 and the flat bearing 9, 10 together constitute five simple bilateral restraints on the slide 5 acting as a three-point support for the slide 5 on the bed 1. The cylindrical bearings 19 permit movement of the slide 5 axially of the shaft 4, while the flat bearings 9, 10 effectively prevents rotation of the slide 5 about the axis of the shaft 4. Therefore the slide 5 is supported entirely hydrostatically. This gives rise to simplifications in construction since the isostatic support of the slide 5 allows wider machining tolerances than with conventional slides supported at four or more points or supported continuously along their length. Variations in the slide dimensions caused by temperature changes and by reactions and elastic yielding of the structure are tolerated satisfactorily.

Figure 2:
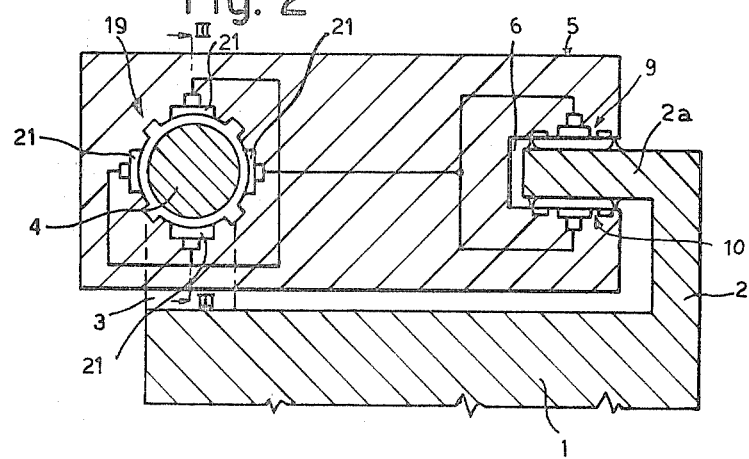
FIG. 2 is a section along the line II—II of FIG. 1 showing a simplified view on an enlarged scale.

In particular, thermal expansion has no influence at all upon the position of the plane coincident with the plane of section III—III in FIG. 2; this plane can, therefore, in a machine tool, be regarded as a datum level, with the great advantage of allowing accurate relative placing of the different parts of the tool to give constancy of qualitative performance.

Moreover the contraposition of the pressure pads of each hydrostatic bearing allows the slide 5 to work in any orientation.

The bilateral supports achieved by means of the bearing 9, 10 and the tongue member 2a completely resolves the difficulty of obtaining adequate sealing around the working area. In fact the annular shape of each block 9 and 10 permits the use of a sealing strip 18 of simple construction which, in spite of travelling movement with reduced friction, effectively seals the support.

It will be appreciated that details of construction can be widely varied from what is illustrated and described purely by way of example, without nevertheless going outside the scope of the present invention as defined in the appended claim.

What is claimed is:

1. In a machine tool having a bed, a shaft fixed in said bed, a slide having a bore therethrough receiving said shaft for sliding movement of said slide on said shaft, two cylindrical hydrostatic bearings located in said bore around said shaft in axially spaced relation to each other, each of said cylindrical hydrostatic bearings having a plurality of hydrostatic pressure pads spaced apart about the circumference of said shaft, a slot member, a tongue member extending into said slot member, one of said members being disposed on said slide and the other of said members being disposed on said bed to prevent rotation of said slide about said shaft, the member disposed on said slide having a single hydrostatic bearing in the form of a pair of flat parallel pressure pads acting on flat parallel surfaces of said other member, the tip of said tongue member being spaced from the base of said slot member to provide clearance therebetween.

* * * * *